(12) United States Patent
Shimomura et al.

(10) Patent No.: US 6,340,274 B1
(45) Date of Patent: Jan. 22, 2002

(54) INTERFERENCE FIT TYPE CUTTING TOOL

(75) Inventors: Hiroshi Shimomura; Hidehiko Nagaya, both of Ishige-machi (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/440,282

(22) Filed: Nov. 15, 1999

(30) Foreign Application Priority Data

Dec. 9, 1998 (JP) .......................................... 10-350404
Apr. 28, 1999 (JP) .......................................... 11-123211

(51) Int. Cl.[7] .......................... B23B 27/00; B23B 29/04
(52) U.S. Cl. ............................ 407/34; 407/72; 407/87; 82/158; 29/447
(58) Field of Search ........................... 407/72, 73, 87, 407/34; 82/158, 160; 408/731, 199, 239 A; 279/103, 145; 29/447, 508, 517

(56) References Cited

U.S. PATENT DOCUMENTS

| 3,994,615 A | | 11/1976 | Narang | |
|---|---|---|---|---|
| 4,337,980 A | * | 7/1982 | Krekeler | ..................... 299/102 |
| 4,452,325 A | | 6/1984 | Radd et al. | |
| 4,913,607 A | * | 4/1990 | Von Hass | ................... 409/234 |
| 4,981,057 A | * | 1/1991 | Von Hass et al. | ............. 82/160 |
| 5,140,739 A | | 8/1992 | Yamaguchi et al. | |
| 5,209,146 A | * | 5/1993 | Armbrust et al. | ............. 82/160 |
| 5,280,671 A | | 1/1994 | Marquart | |
| 5,873,682 A | * | 2/1999 | Tripsa | ........................ 407/101 |
| 5,879,766 A | | 3/1999 | Kato | |
| 5,924,206 A | * | 7/1999 | Cote et al. | ..................... 30/337 |
| 6,109,152 A | * | 8/2000 | Hecht | .......................... 82/160 |

FOREIGN PATENT DOCUMENTS

| DE | 36 07 938 | 9/1987 |
|---|---|---|
| DE | 39 31 536 | 4/1990 |
| DE | 42 15 606 | 11/1993 |

* cited by examiner

Primary Examiner—Henry Tsai
(74) Attorney, Agent, or Firm—Oblon, Spivak, McClelland, Maier & Neustadt, P.C.

(57) ABSTRACT

In an interference fit type cutting tool according to the present invention, a projection 8 of an edge section 2 and a hole portion 10 of a shank section 3 are fitted by shrinkage fitting. The shank section 3 is provided with an insertion hole 14 that is coaxial with the center axis O2 thereof, and a threaded hole 14b is provided in a part thereof. A rodlike set screw 15 is in threaded engagement with the insertion hole 14, and a leading end portion 15a thereof can project into a space 13 between the projection 8 and the hole portion 10. By screwing the set screw 15 in to press an end face 8b of the projection 8 of the edge section 2 in a heated state, the edge section 2 can be detached from the shank section 3, and the edge section 2, the shank section 3, and the like can be replaced without causing the problem of waste oil disposal and without chipping the edge section 2 or the like.

11 Claims, 8 Drawing Sheets

INTERFERENCE FIT TYPE CUTTING TOOL

BACKGROUND OF THE INVENTION

1. Field of the Invention

The present invention relates to an interference fit type cutting tool having a tool holding section and a tool mounted therein.

This specification is based on patent applications filed in Japan (Japanese Patent Applications Nos. 10-350404 and 11-123211), and the descriptions in the Japanese applications are incorporated as a part of this specification.

2. Background Art

Conventionally, a cutting tool is known as an example of this type of cutting tool, in which a projection is formed in one of an edge section and a shank section, a recess is formed in the other section, and the projection and the recess are fitted by shrinkage fitting.

In a case in which the cutting tool is, for example, a milling tool such as an endmill, the shank section is made of, for example, steel, and the edge section is made of cemented carbide or the like and is detachably and replaceably fitted by shrinkage fitting. By making the edge section replaceable, edge sections having different types of cutting edges can be mounted.

When producing such a cutting tool using shrinkage fitting, while the shank section with a recess having a substantially high coefficient of thermal expansion is heated, the recess and a projection of the edge section are fitted together. In this case, when the shank section having the recess is heated to, for example, approximately 200° C., the recess is thereby expanded so that the inner diameter exceeds the interference for fitting to the projection, and is allowed to be fitted.

When the edge section is detached from the shank section in the fitted cutting tool, however, if the shank section having the recess is heated, the edge section having the projection is simultaneously heated and is thermally expanded. Therefore, the shank section must be heated above approximately 300° C. to detach the edge section, and this is inefficient. Furthermore, when there is a small difference in coefficient of thermal expansion between the materials of the edge section and the shank section, it is more difficult to detach the edge section.

As a method of overcoming such problems, a technique has been disclosed and proposed in Japanese Unexamined Patent Publication No. 10-34408.

In this method, a space is formed over the entire periphery of a fitting section between a projection and a recess of an edge section and a tool holder that are fitted together, the edge section is pushed by supplying hydraulic pressure into the space during heating, and is thereby detached from the tool holder. Another means has also been proposed in which a tool holder is provided with a communication hole that extends to a fitting section, and a rod is inserted in the communication hole in a heated state and is struck with a hammer to apply impact, thereby detaching the edge section.

In the above-described detaching method using hydraulic pressure, however, a high-temperature state is established by heating when detaching the edge section, and there is a danger that oil will ignite, and waste oil disposal is necessary. In the method using the rod for striking, since the communication hole forms a space during cutting, stiffness and strength of the tool are deteriorated, rotation balance may be upset, and whirling may be caused by vibration. Furthermore, there is a danger that the edge section will be chipped due to impact resulting from being struck by the hammer, that the service life will be shortened, and that an operator will suffer burns.

SUMMARY OF THE INVENTION

An object of the present invention is to provide a safe interference fit type cutting tool that does not affect the environment and does not shorten tool life.

Another object of the present invention is to improve workability in replacing a tool, a tool holding section, or the like in a cutting tool.

An interference fit type cutting tool according to the present invention includes a tool and a tool holding section that are detachably fitted together, wherein a presser section is provided to separate one of the tool and the tool holding section from the other.

When detaching the tool after interference fitting, the fitting strength is weakened by heating or cooling the interference-fitted section, the tool and/or the tool holding section is directly or indirectly pushed by operating the presser section, and one of the tool and the tool holding section is separated from the other, whereby the tool or the tool holding section can be detached.

According to a preferred embodiment of the present invention, one of the tool and the tool holding section has a projection, and the other has a hole portion to be fitted on the projection. One of the projection and the hole portion has an interference, and a presser member serving as the presser section is mounted in one of the tool and the tool holding section so as to press the other.

By pushing the projection or the hole portion by the presser member while the fitted portion between the projection and the hole portion is heated and cooled, the tool and the tool holding section can be separated from each other.

According to another preferred embodiment of the present invention, the presser member is in threaded engagement with a threaded hole formed in the tool holding section and is able to push the tool.

Since cutting is performed with the presser member in threaded engagement with the threaded hole, tool stiffness and strength are not lowered. In the case of a milling tool, it is possible to avoid the dangers of upsetting the rotation balance and of whirling due to vibration. Detachment of the tool is safe and does not result in a problem of waste oil disposal and the like because a hydraulic mechanism or the like is not used. Furthermore, since the tool is pushed by the presser member without being struck, it will not be chipped, and the service life thereof will not be shortened.

According to another preferred embodiment of the present invention, an intermediary member is provided in a space formed between the tool and the tool holding section, and the presser member is placed to push the intermediary member, and to push at least one of the tool holding section and the tool via the intermediary member.

By providing the intermediary member in the space, it is possible to make the presser member small, and to pull out one of or both the tool and the tool holding section.

According to a further preferred embodiment of the present invention, the tool and the tool holding section have projections, and both the projections are fitted and connected by a connecting member. One of the projections and the connecting member has an interference, and a presser member serving as a presser section is mounted in one of the connecting member, the tool, and the tool holding section so as to press at least one of the tool holding section and the tool.

Therefore, the tool or the tool holding section can be detached by operating the presser member to push the tool or the tool holding section while the connecting member is subjected to heating or other processes. Since a hydraulic mechanism or the like is not used in the operation of detaching the tool or the tool holding section, the operation is safe and the problem of waste oil disposal does not arise. Furthermore, since the tool or the like is pushed by the presser member without being struck, it will not be chipped, and the service life thereof will not be shortened.

According to a further preferred embodiment of the present invention, an intermediary member is provided in a space formed between the projections of the tool and the tool holding section and the connecting member, and the presser member is placed to push the intermediary member, and is able to push at least one of the tool holding section and the tool via the intermediary member.

The placement of the intermediary member in the space allows the presser member to be small.

According to a still further preferred embodiment of the present invention, the presser section is a stepped portion formed by making the diameter of at least a part of the base end portion of the tool larger than that of the leading end portion of the tool holding section.

When the tool is drawn out of the tool holding section, the interference-fitted section is heated or cooled, and a jig can be pulled out while being caught by the stepped portion of the tool, which allows the tool to be easily separated. Moreover, this stepped portion ensures a clearance between the tool holding section and a workpiece, which smoothes the movement of the cutting tool and the discharge of chips.

According to a further preferred embodiment of the present invention, the tool and the tool holding section have projections, and both the projections are fitted and connected by the connecting member. One of the projections and the connecting member has an interference. The presser section is a stepped portion formed by making the diameter of at least a part of the base end portion of the tool larger than that of the leading end portion of the tool holding section.

According to a still further preferred embodiment of the present invention, a cutting edge is provided in the stepped portion.

According to this structure, cutting can also be performed with the cutting edge provided in the stepped portion even when the cutting tool is pulled back, which facilitates finishing and lifting of the cutting tool.

DESCRIPTION OF THE PREFERRED EMBODIMENTS

A first embodiment of the present invention will be described below with reference to FIG. 1.

Figure 1:
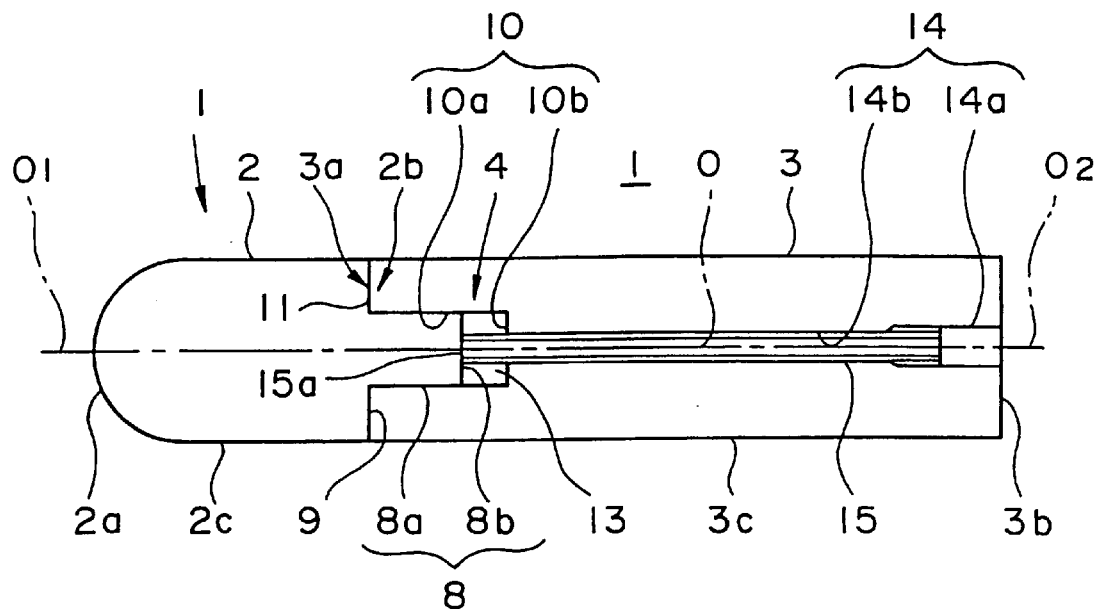
FIG. 1 is a longitudinal sectional view showing the principal part of a ball endmill according to a first embodiment of the present invention.

A ball endmill 1 shown in FIG. 1 is formed of a combination of an edge section 2 and a shank section 3 that are shrinkage-fitted in a fitting section 4.

The edge section 2 is made of, for example, a high-hardness material, such as cemented carbide, cermet, or ceramic, and is substantially cylindrical. A leading end portion 2a thereof is substantially hemispherical. The leading end portion 2a is provided with a cutting edge, for example, of substantially a ¼-arc shape. In a base end portion 2b, a projection 8 of a substantially cylindrical shape is formed to have a smaller diameter than that of an outer peripheral surface 2c, and the peripheral portion thereof is formed into a ring-shaped contact face 9. The projection 8 is formed coaxially with the center axis O1 of the edge section 2.

The shank section 3 is made of a material having a higher coefficient of thermal expansion (coefficient of linear expansion) than that of the edge section 2, for example, steel, and is substantially cylindrical. The outer diameter of an outer peripheral surface 3c thereof is almost the same as that of the outer diameter of the outer peripheral surface 2c of the edge section 2. In a leading end portion 3a, a hole portion 10 of, for example, a substantially cylindrical shape is formed to have a smaller diameter than that of the outer peripheral surface 3c, and a ring-shaped contact face 11 is formed on the outer peripheral side. The hole portion 10 includes a cylindrical peripheral surface 10a and a circular bottom face 10b. The hole portion 10 is formed coaxially with the center axis O2 of the shank section 3.

The projection 8 of the edge section 2 and the hole portion 10 of the shank section 3 constitute the fitting section 4 where they are fitted together by shrinkage fitting. An outer diameter d1 of the projection 8 in the edge section 2 is set to be slightly larger than an inner diameter d2 of the hole portion 10 in the shank section 3, and the size difference (d1−d2) therebetween serves as an interference in shrinkage-fitting the projection 8 in the hole portion 10. The depth of the hole portion 10 in the shank section 3 in the direction of the center axis O2 is set to be slightly larger than the length of the projection 8 in the edge section along the center axis O1. In a fitted state shown in FIG. 1 in which the contact faces 9 and 11 of the edge section 2 and the shank section 3 are in contact with each other, a small space 13 is formed between the end face 8b of the projection 8 and the bottom face 10b of the hole portion 10.

In the shank section 3, an insertion hole 14 is formed coaxially with the center axis O2 so as to penetrate between a base end face 3b and the bottom face 10b of the hole portion 10 at the leading end. The insertion hole 14 is composed of an insertion portion 14a on the base end side, and a threaded hole 14b on the leading end side. A rodlike set screw 15 serving as a presser member is in threaded engagement with the insertion hole 14, for example, which is externally threaded over the entire length thereof. A leading end portion 15a of the set screw 15 is projected into the space 13 of the fitting section 4 by screwing the set screw 15 therein, thereby pushing the end face 8b of the projection 8 in the edge section 2.

The ball endmill 1 of this embodiment is configured as described above. Next, description will be given of fitting and detaching methods therefore.

In a state in which the edge section 2 and the shank section 3 are separate, the inner diameter d2 of the hole portion 10 in the shank section 3 is enlarged to be larger than the outer diameter d1 of the projection 8 by heating the shank section 3 above ordinary temperature. In this state, the projection 8 and the hole portion 10 are fitted to a position where the contact faces 9 and 11 contact, thereby establishing shrinkage fitting.

When the edge section 2 and the shank section 3 return to ordinary temperature, the hole portion 10 contracts and decreases its diameter. Therefore, the projection 8 is firmly shrinkage-fitted in the hole portion 10 by the pressure of interference corresponding to the difference (d1–d2) in diameter between the projection 8 and the hole portion 10.

In this way, the ball endmill 1 shown in FIG. 1 is produced. In this state, the center axes O1 and O2 are made coaxial, and coincide with the center axis O of the ball endmill 1.

Next, when replacing the edge section 2 because of wear, change of use, or for other reasons, both the edge section 2 and the shank section 3 are thermally expanded by heating the fitting section 4 of the ball endmill 1. Since the shank section 3 has a higher coefficient of thermal expansion, the hole portion 10 undergoes greater thermal expansion than the projection 8 does. For this reason, fitting strength is small even when the inner diameter d2 of the hole portion 10 is less than the outer diameter d1 of the projection 8.

By screwing the set screw 15 in from the insertion hole 14 at the base end face 3b of the shank section 3 with a working tool, such as a wrench or a driver, in a state in which the inner diameter d2 of the hole portion 10 is slightly greater than the outer diameter d1 of the projection 8, the end face 8b of the projection 8 can be pushed by the leading end portion 15a in a direction in which it is detached from the hole portion 10, and the edge section 2 can be easily detached from the shank section 3.

As described above, according to this embodiment, when the edge section 2 is detached from the shank section 3, it can be easily detached in a state in which fitting strength is weakened, by being pushed by the set screw 15 in threaded engagement with the shank section 3 even when the inner diameter d2 of the hole portion 10 is not sufficiently greater than the outer diameter d1 of the projection 8.

In addition, since a hydraulic mechanism or the like is not used in detaching the edge section 2, there is no danger of ignition, and waste oil disposal is unnecessary. Furthermore, since the edge section 2 can be detached without applying impact thereto, it will be chipped, and the service life will not be shortened. Moreover, an operator will not suffer burns.

Next, other embodiments of the present invention will be described. The same or similar components and members as or to those in the above-described first embodiment are denoted by the same numerals.

Figure 2:
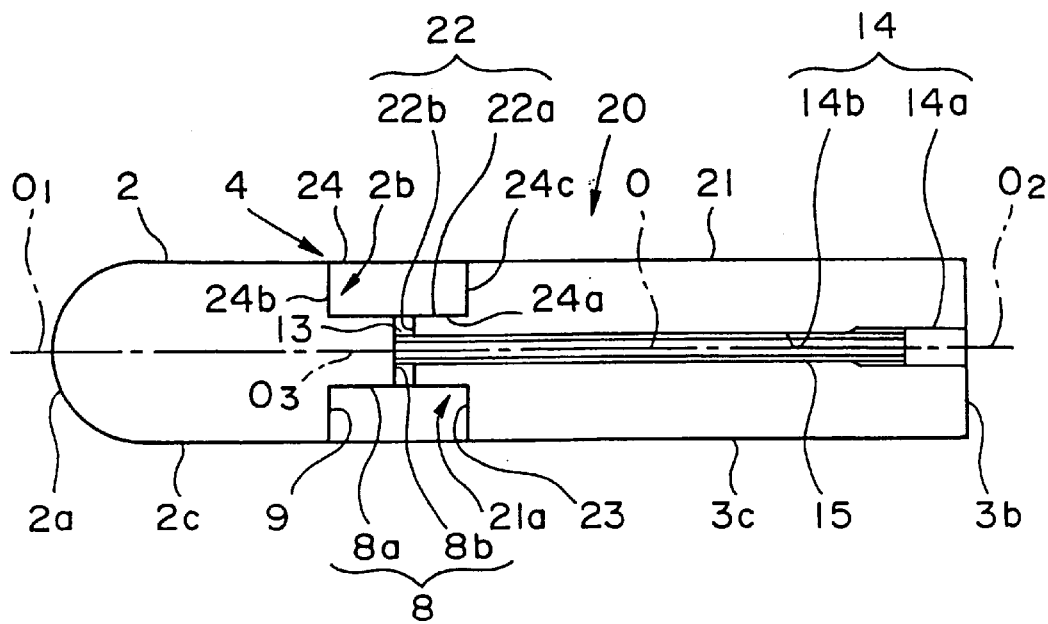
FIG. 2 is a sectional view showing the principal part of a ball endmill according to a second embodiment.

In a ball endmill 20 shown in FIG. 2 according to a second embodiment of the present invention, both an edge section 2 and a shank section 21 are made of cemented carbide, cermet, ceramic, or the like. By making the shank section 21 of a material having high hardness and high rigidity, for example, cemented carbide, a vibration isolating effect is enhanced during tool rotating cutting. The edge section 2 has the same structure as that of the above first embodiment, and is provided with a projection 8 in a base end portion 2b thereof.

In a leading end portion 21a of the shank section 21, a second projection 22 projects coaxially with the center axis O2. The second projection 22 is shaped like a cylinder having almost the same outer diameter d1 as that of the projection 8 in the edge section 2, and includes a cylindrical peripheral surface 22a and an end face 22b. A ring-shaped second contact face 23 is formed on the outer peripheral side of the second projection 22. Moreover, an insertion hole 14, which penetrates the shank section 21 coaxially with the center axis O2, also penetrates coaxially with the end face 22b of the second projection 22. A set screw 15 is in retractable and threaded engagement with the insertion hole 14, and a leading end portion 15a thereof is allowed to project from the end face 22b of the second projection 22.

In a fitting section 4, a substantially cylindrical connecting member 24 is provided to shrinkage-fit the projection 8 of the edge section 2 and the second projection 22 of the shank section 21 opposed to each other. The connecting member 24 is made of a material having a higher coefficient of thermal expansion than that of those of the edge section 2 and the shank section 21, for example, steel. The inner diameter d3 of an inner peripheral surface 24a is set to be less than the outer diameter d1 of the projections 8 and 22 at ordinary temperature, and the difference (d1–d3) therebetween serves as an interference for shrinkage fitting.

The length L of the connecting member 24 along the center axis O3 has a relationship, which is given by the expression L≧L1+L2, with the length L1 of the projection 8 and the length L2 of the second projection 22 in the same direction. Referring to FIG. 2, L is set to be larger than the sum of L1 and L2. In a shrinkage-fitted state, a space 13 is formed between the inner peripheral surface 24a of the connecting member 24 and the projections 8 and 22, and the leading end portion 15a of the set screw 15 is allowed to project into the space 13.

The center axes O1, O2, and O3 are coaxial, and coincide with the center axis of the ball endmill 20.

Since this embodiment is configured as described above, the projection 8 of the edge section 2 and the second projection 22 of the shank section 21 are inserted in the connecting member 24 from both ends in a state in which the connecting member 24 is heated and enlarges its diameter. By cooling and contracting the connecting member 24, the edge section 2 and the shank section 21 are shrinkage-fitted at the projections 8 and 22. In this case, the contact faces 9 and 23 of the edge section 2 and the shank section 21 are in contact with both the end faces 24b and 24c of the connecting member 24, and the space 13 is formed between the projections 8 and 22.

In order to detach the edge section 2, the set screw 15 is screwed into the insertion hole 14 of the shank section 21 while the connecting member 24 is heated. Thereby the edge section 2, whose fitting by the connecting member 24 has been loosened, is pushed by the leading end portion 15a, and is detached.

Therefore, this embodiment can also provide the same operations and advantages as those in the above-described first embodiment. Moreover, both the edge section 2 and the shank section 21 have high stiffness and a high vibration isolating effect. Next, a third embodiment of the present invention will be described with reference to FIG. 3.

Figure 3:
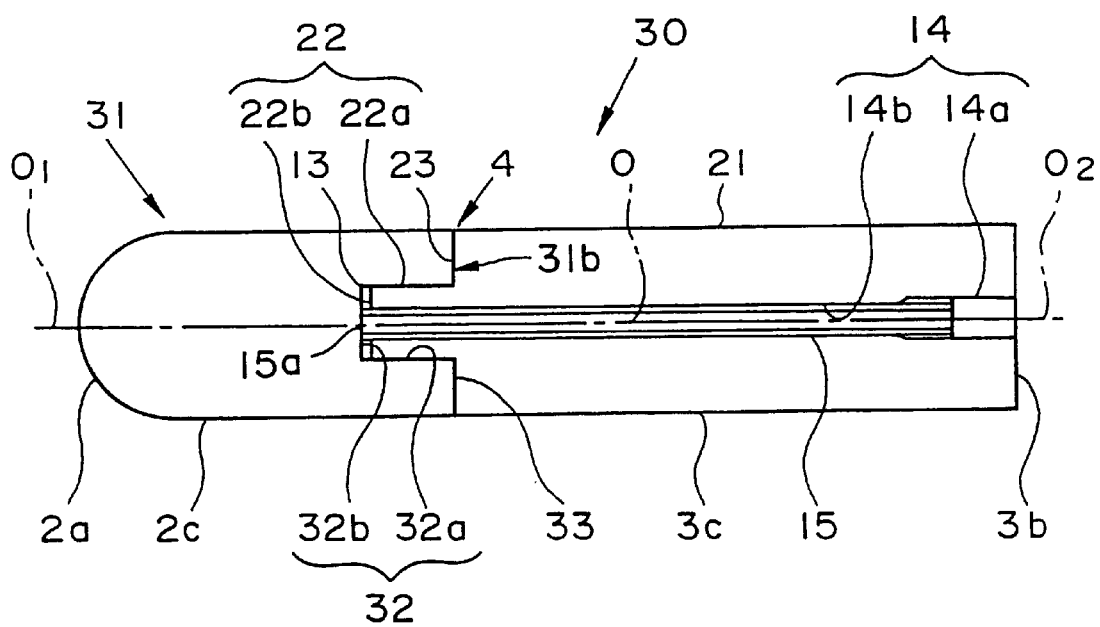
FIG. 3 is a sectional view showing the principal part of a ball endmill according to a third embodiment.

In a ball endmill 30 shown in FIG. 3, a shank section 21 has a structure similar to that in the second embodiment, and is made of a high-hardness material such as cemented carbide, cermet, or ceramic. In contrast, an edge section 31 is made of a material having a higher coefficient of thermal expansion than that of the shank section 21, for example, steel. A hole portion 32 of, for example, a substantially cylindrical shape and having a smaller diameter than that of an outer peripheral surface 2 is formed in a base end portion 31b, and a ring-shaped contact face 33 is formed on the outer peripheral side. The hole portion 32 includes a cylindrical peripheral surface 32a and a circular bottom face 32b. The hole portion 32 is formed coaxially with the center axis O1 of the edge section 31.

Moreover, the inner diameter d4 of the hole portion 32 is set to be smaller than the outer diameter d1 of a second projection 22 of the shank section 21, and the size difference (d1–d4) therebetween serves as an interference for shrinkage fitting.

In this embodiment, the inner diameter of the hole portion 32 is enlarged by heating the edge section 31, so that the hole portion 32 can be shrinkage-fitted on the projection 22 of the shank section 21. When detaching the edge section 31, the set screw 15 is screwed in so that the leading end portion 15a pushes the bottom face 32b of the hole portion 32 in a state in which the edge section 31 is heated and the fitting strength thereof is weakened. This allows the edge section 31 to be easily detached from the shank section 21.

Next, a fourth embodiment of the present invention will be described with reference to FIG. 4.

Figure 4:
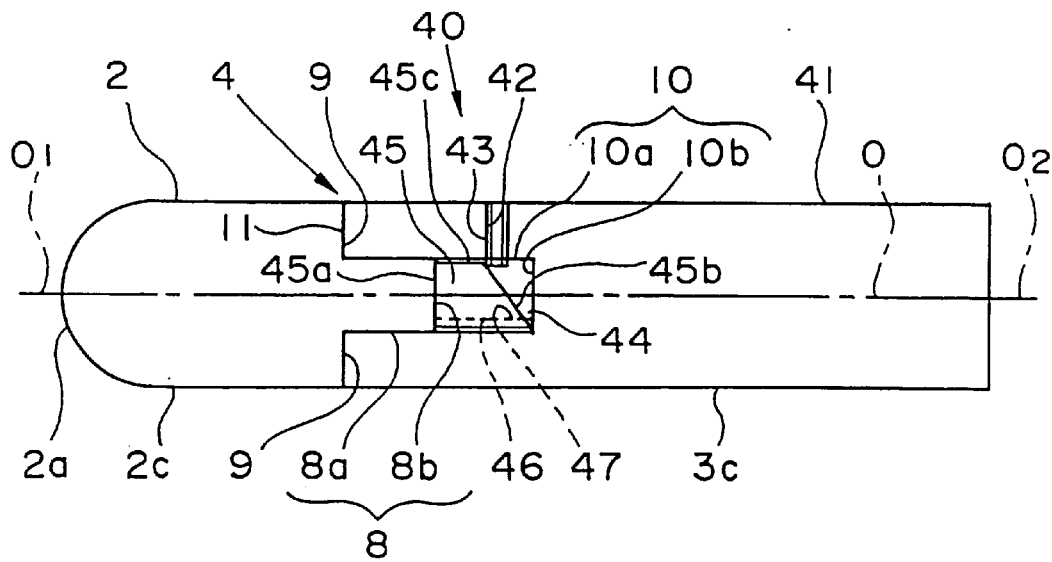
FIG. 4 is a sectional view showing the principal part of a ball endmill according to a fourth embodiment.

In a ball endmill 40 shown in FIG. 4, an edge section 2 has almost the same structure as that in the first embodiment, and is made of a high-hardness material such as cemented carbide, cermet, or ceramic. A shank section 41 is made of a material having a higher coefficient of thermal expansion than that of the edge section 2, for example, steel, and has almost the same structure as that in the first embodiment except that the insertion hole 14 and the set screw 15 are not provided therein.

A threaded hole 42 serving as an insertion hole is bored in the shank section 41 so as to extend from an outer peripheral surface 3c inward in the direction of the center axis O2, that is, in the radial direction. The threaded hole 42 penetrates an inner peripheral surface 10a and communicates with a hole portion 10. A headless screw 43 serving as a presser member is placed in threaded engagement with the threaded hole 42 so as to project into and retract from the hole portion 10.

In a state in which a projection 8 of the edge section 2 and the hole portion 10 of the shank section 41 are shrinkage-fitted so that contact faces 9 and 11 thereof contact, a substantially cylindrical space 44 is defined by the inner peripheral surface 10a and a bottom face 10b of the hole portion 10 and an end face 8b of the projection 8. In this space 44, a block 45 is slidably held, and is substantially cylindrical. One end face 45a thereof is nearly orthogonal to the center axis O1 (O2), and faces or contacts the end face 8b of the projection 8. The other end face is formed into an inclined face 45b that is inclined in a direction acutely intersecting the end face 45.

The threaded hole 42 is opened at the position on the inner peripheral surface 10a nearly opposed to the inclined face 45b. The leading end portion of the headless screw 43 projecting from the threaded hole 42 presses the inclined face 45b of the block 45, pushes the block 45, and pushes the projection 8 of the edge section 2 in a direction in which the edge section 2 separates from the hole portion 10.

Preferably, a concave groove 46 is formed along the center axis O2 on an outer peripheral surface 45c of the block 45 so that the circumferential position of the inclined face 45b with respect to the headless screw 43 does not change, and a rib 47 is formed on the inner peripheral surface 10a of the hole portion 10 so as to be slidably fitted in the concave groove 46. The rib 47 is formed inside the hole portion 10 as long as it does not contact with the projection 8 to be shrinkage-fitted, that is, within the space 44.

The block 45 and the edge section 2 may be integrally formed.

Since this embodiment has the above-described configuration, in order to perform shrinkage fitting, the shank section 41 is heated in a state in which the block 45 is previously inserted in the hole portion 10 of the shank section 41 and the concave groove 46 of the block 45 is fitted on the rib 47, and the projection 8 of the edge section 2 is shrinkage-fitted in the hole portion 10.

When detaching the edge section 2, while the hole portion 10 of the shank section 41 is heated to weaken the strength of fitting to the projection 8, the headless screw 42 is screwed in from the outer peripheral surface 3c of the shank section 41, so that the leading end portion projects into the hole portion 10 and presses the inclined face 45b of the block 45. Then, since the inclined face 45b is placed at an angle to the headless screw 42, it is pushed to press the projection 8, thereby detaching the edge section 2 from the shank section 41. According to this embodiment, the lengths of the threaded hole 42 and the headless screw 43 provided in the radial direction are shorter than those of the insertion hole 14 and the set screw 15 provided in the direction of the center axis O in the above embodiment, which facilitates working and further reduces the costs.

Next, a fifth embodiment of the present invention will be described with reference to FIG. 5.

Figure 5:
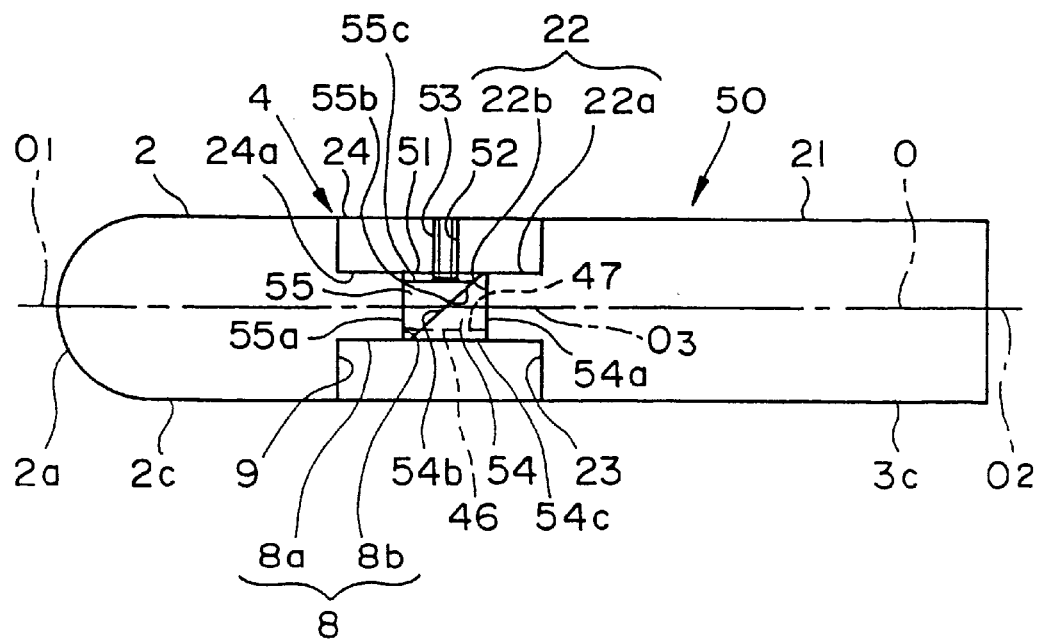
FIG. 5 is a sectional view showing the principal part of a ball endmill according to a fifth embodiment.

In a ball endmill 50 shown in FIG. 5, an edge section 2, a shank section 21, and a connecting member 24 have similar structures in those in the second embodiment. The edge section 2 and the shank section 21 are made of cemented carbide, cermet, ceramic, or the like, and the connecting member 24 is made of a material having a higher coefficient of thermal expansion than those of the edge section 2 and the shank section 21, for example, steel. The shank section 21 is not provided with the insertion hole 14 and the set screw 15.

In this ball endmill 50, while a projection of the edge section 2 and the shank section 21 are shrinkage-fitted via the connecting member 24, a space 51 of, for example, a substantially cylindrical shape, which is defined by an end face 8b of the projection 8, a leading end face 22b of a second projection 22, and an inner peripheral surface 24a of the connecting member 24, is formed coaxially with the center axis O3. In the center of the connecting member 24, a threaded hole 52 (insertion hole) is formed toward the center axis O3 in the radial direction. A headless screw 53 (presser member) is in threaded engagement with the threaded hole 52 so that the leading end portion thereof can project into and retract from the space 51.

Inside the space 51, a first block 54 and a second block 55 in a substantially cylindrical shape are held in contact with each other. One end face 54a of the first block 54 is placed nearly orthogonal to the center axis O3 and in contact with the leading end face 22b of the second projection 22, and the other opposite end face is formed into an inclined guide face 54b that is inclined with respect to the center axis O3.

Furthermore, a cylindrical peripheral surface 54c of the first block 54 is provided with a concave groove 46, and the inner peripheral surface 24a of the connecting member 24 is provided with a rib 47, which allows the first block 54 to slide without displacing the circumferential position thereof.

The second block 55 is formed so that the outer diameter thereof is smaller than that of the first block 54. One end face 55a is placed orthogonal to the center axis O3 and in contact with the end face 8b of the projection 8 in the edge section 2, and the other opposite end face is formed into an inclined face 55b that is inclined with respect to the center axis O3 and faces the inclined guide face 54b of the first block 54.

The leading end portion of the headless screw 53 in threaded engagement with the threaded hole 52 of the connecting member 24 can push the outer peripheral surface 55c of the second block 55 inside the space 51 in the radial direction.

Therefore, in order to detach the edge section 2 in the ball endmill 50 shrinkage-fitted, as shown in FIG. 5, in this embodiment, the headless screw 53 is screwed in so as to project into the space 51 and to push the second block 55 in the radial direction while a fitting section 4 using the connecting member 24 is heated. Thereby the second block 55 is pushed toward the edge section 2 along the inclined guide face 54b of the first block 54, and pushes the projection 8, whereby the edge section 2 in weakened engagement with the connecting member 24 can be detached.

Simultaneously, the shank section 21, in which the second projection 22 is pushed via the first block 54 pushed by the second block 55, is also detached from the connecting member 24.

While the first and second blocks 54 and 55 are formed separate from the edge section 2 and the shank section 21 in the embodiment, the first block 54 may be formed integrally with the shank section 21.

Next, a sixth embodiment of the present invention will be described with reference to FIG. 6.

Figure 6:
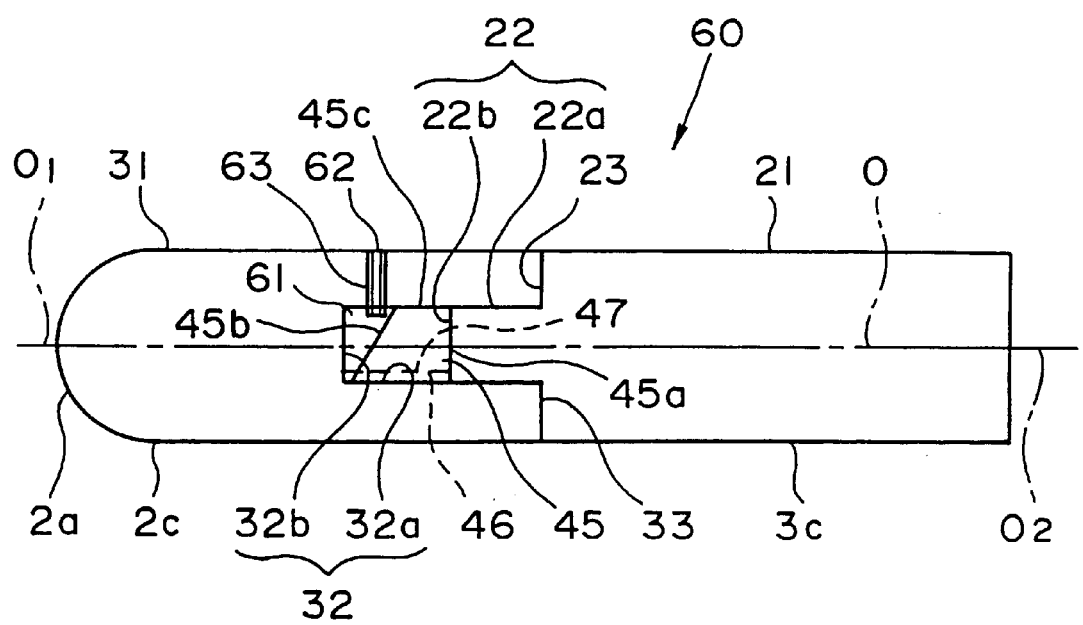
FIG. 6 is a sectional view showing the principal part of a ball endmill according to a sixth embodiment.

In a ball endmill 60 shown in FIG. 6, an edge section 31 and a shank section 21 have almost the same structures as those in the third embodiment, and the shank section 21 is made of a high-hardness material such as cemented carbide, cermet, or ceramic. The edge section 31 is made of a material having a higher coefficient of thermal expansion than that of the shank section 21, whereas it is not provided with the insertion hole 14 and the set screw 15.

In a state in which a second projection 22 of the shank section 21 is shrinkage-fitted in a hole portion 22 of the edge section 31, a substantially cylindrical block 45 is slidably held in a substantially cylindrical space 61 defined by an inner peripheral surface 32a and a bottom face 32b of the hole portion 22 and a leading end face 22b of the second projection 22. One end face 45a of the block 45 orthogonal to the center axis O1 is in contact with the leading end face 22b of the second projection 22, and an opposite inclined face 45b faces the bottom face 32b.

A threaded hole 62 is bored in the edge section 31 so as to extend inward from an outer peripheral surface 2c in the direction of the center axis O1, that is, in the radial direction. The threaded hole 62 penetrates the inner peripheral surface 32a of the hole portion 32 and communicates with the space 61. A headless screw 63 (presser member) is in threaded engagement with the threaded hole 62 (insertion hole), and is placed so as to project into and retract from the space 61. The leading end portion of the headless screw 62 presses the inclined face 45b of the block 45 inside the space 61, and pushes the block 45 toward the shank section 21.

In order that the circumferential position of the inclined face 45b with respect to the headless screw 63 does not change, a concave groove 46 is formed on the outer peripheral surface 45c of the block 45 along the center axis O1, and a rib 47 is formed on the inner peripheral surface 32a of the hole portion 32 within the space 61 so as to be slidably fitted in the concave groove 46.

The block 45 and the shank section 21 may be integrally formed.

This embodiment has the above-described configuration. When detaching the edge section 31 in a shrinkage-fitted state shown in FIG. 6, the hole portion 32 of the edge section 31 is heated to weaken the strength of fitting to the second projection 22, the headless screw 63 is screwed in from the outer peripheral surface 2c of the edge section 31, and the leading end portion thereof is projected into the hole portion 61 to press the inclined face 45b of the block 45. Then, the inclined face 45b is pushed with respect to the headless screw 63 to push the second projection 22, whereby the edge section 31 can be detached from the shank section 21.

While the shank section 3 or 21 is provided with the insertion hole 14 and the set screw 15 is in threaded engagement therewith in the first to third embodiments described above, the insertion hole 14 and the set screw 15 need not always be formed in the shank section, and may be formed coaxially in the edge section 2 or 31. The insertion hole 14 and the set screw 15 need not always be formed coaxially with the center axes O2 and O1 of the shank section 3 or 21 or the edge section 2 or 31, and they may be eccentric as long as they can push the leading end face of the projection 8 or the second projection 22 or the bottom face of the hole portion 10.

While one of the edge section and the shank section is made of cemented carbide, cermet, or ceramic and the other section is made of steel or the like, the materials thereof are not limited to these materials, and various kinds of materials may be adopted. Furthermore, the sections need not always be made of materials having different coefficients of thermal expansion, and may be made of the same material. Even if they are made of the same material, since the inner diameter of the hole portion is larger than the outer diameter of the projection, detachment and replacement in shrinkage fitting are possible. The present invention is also applicable to a case in which the shank section 3, 21, or 41 is replaced.

Figure 7:
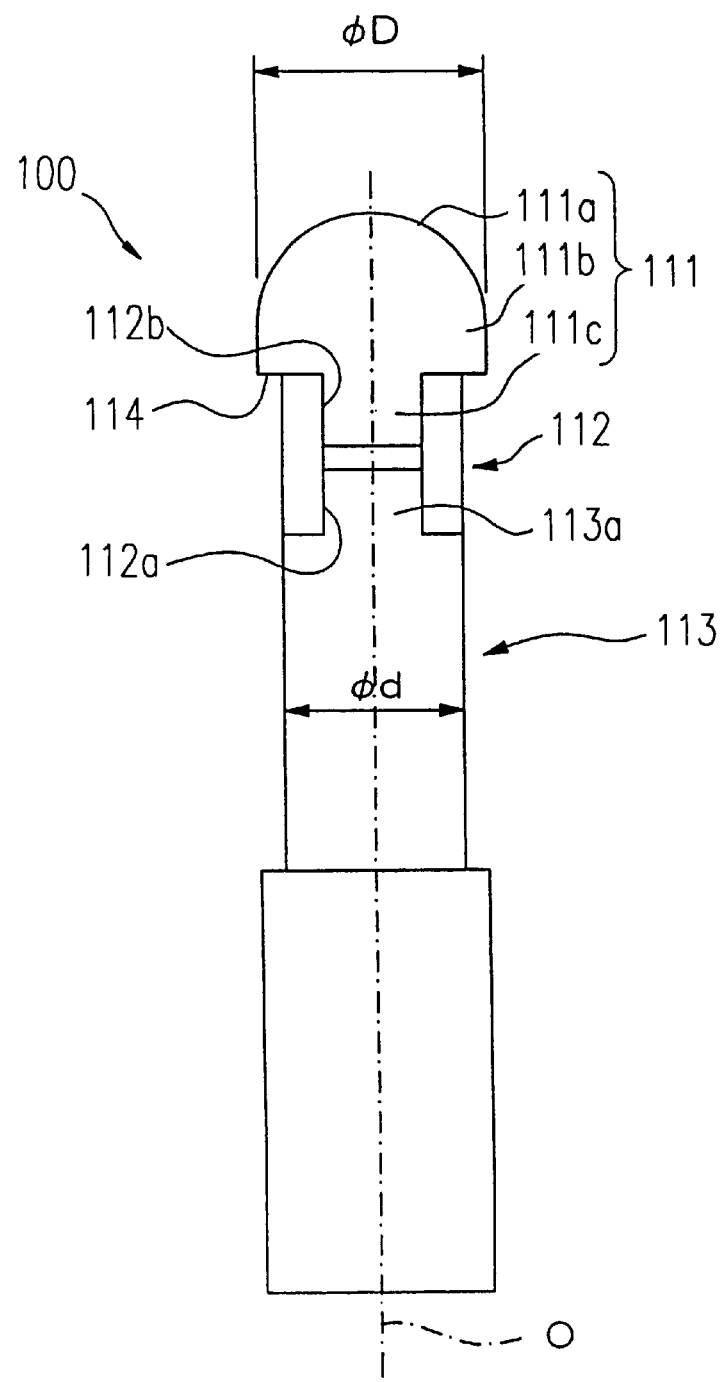
FIG. 7 is a longitudinal sectional view of a ball endmill according to a seventh embodiment.

FIG. 7 is a longitudinal sectional view of a ball endmill according to a seventh embodiment of the present invention. A ball endmill 100 is mainly composed of an edge section 111, a shank section 113, and a connecting member 112 for connecting these sections along the axis O.

The edge section 111 is made of, for example, cemented carbide, and is composed of a substantially hemispherical leading end portion 111a, a base end portion 111b shaped like a cylindrical shaft, and a projection 111c having a smaller diameter than that of the base end portion 111b and shaped like a cylindrical shaft. In the leading end portion 111a, one or more cutting edges (not shown) are provided that are of substantially a ¼-arc shape. The projection 112c is a portion that serves to make connection with the connecting member 112, extends coaxially with the base end portion 111b, and has a slightly larger diameter than the inner diameter of the connecting member 112.

The connecting member 112 is made of a material having a higher coefficient of thermal expansion than those of the edge section 111 and the shank section 113, for example, steel. The connecting member 112 is shaped like a hollow cylinder. The outer diameter φd thereof is smaller than the outer diameter φD of the base end portion 111b, and the inner diameter is slightly smaller than the outer diameter of the projection 111c.

The shank section 113 is made of, for example, cemented carbide, and the outer diameter φd thereof is equal to that of the connecting member 112.

At the leading end of the shank section 113, a projection 113a is coaxially formed so as to make connection with the connecting member 112, and the outer diameter thereof is slightly larger than the inner diameter of the connecting member 112.

Next, description will be given of the procedure for connecting the edge section 111, the connecting member 112, and the shank section 113 together.

First, the connecting member 112 is heated to thermally expand an opening end portion 112a until the projection 113a can be inserted therein, and then the projection 113a is inserted into the opening end portion 112a. Subsequently, when the connecting member 112 is air-cooled or forcibly cooled to decrease its diameter, and the connecting member 112 and the shank section 113 are shrinkage-fitted by the pressure of interference caused by the difference between the outer diameter of the projection 113a and the inner diameter of the opening end portion 112a.

Similarly, when connecting the shank section 113 and the edge section 111, the connecting member 112 is heated to thermally expand an opening end portion 112b until the projection 111c can be inserted therein, and the projection 111c is inserted into the opening end portion 112b. Then, the diameter of the opening end portion 112b is reduced, and the connecting member 112 and the edge section 111 are shrinkage-fitted by the pressure of interference caused by the difference between the outer diameter of the projection 111c and the inner diameter of the opening end portion 112b.

In the ball endmill 100 configured as described above, since the outer diameter φd of the connecting member 112 is smaller than the outer diameter φD of the base end portion 111b, a height difference is formed between the outer peripheral surface of the edge section 111 and the outer peripheral surface of the connecting member 112, which forms a stepped portion 114 between the edge section 111 and the connecting member 112.

In order to replace the edge section 111 of the ball endmill 100, the connecting member 112 is heated to thermally expand the opening end portion 112b until the projection 111c can be drawn out thereof, the stepped portion 114 of the edge section 111 is retained and gripped by a jig, and then, the edge section 111 is drawn out of the connecting member 112.

Accordingly, in the ball endmill 100 of this embodiment, workability in replacing the edge section is greatly enhanced.

Since a clearance corresponding to the stepped portion 114 is ensured between the shank section 113 and a workpiece, it is possible to effectively prevent the shank section 113 and the workpiece from interfering with each other during cutting.

Figure 8:
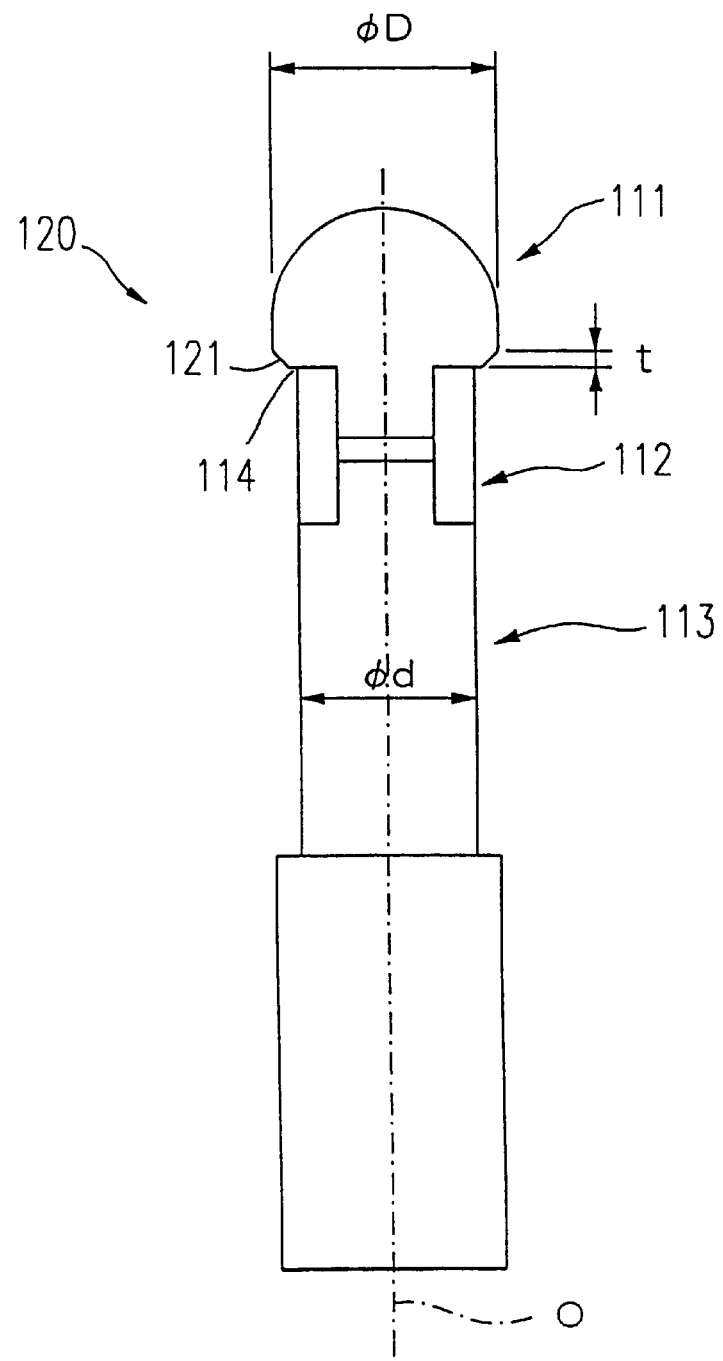
FIG. 8 is a longitudinal sectional view of a ball endmill according to an eighth embodiment.

FIG. 8 shows a ball endmill 120 according to an eighth embodiment of the present invention. The same elements and components as those in FIG. 7 are denoted by the same numerals, and description thereof is omitted.

This ball endmill 120 is characterized in that at least one or more cutting edges 121 are provided in a stepped portion 114 formed between an edge section 111 and a connecting member 112. The cutting edge 121 extends so that the outer diameter gradually increases toward the leading end along the axis O, as shown in FIG. 8. The length t along the axis O and the crossing angle with respect to the axis O of the cutting edge 121 may be appropriately set according to cutting conditions or the like.

Figure 9:
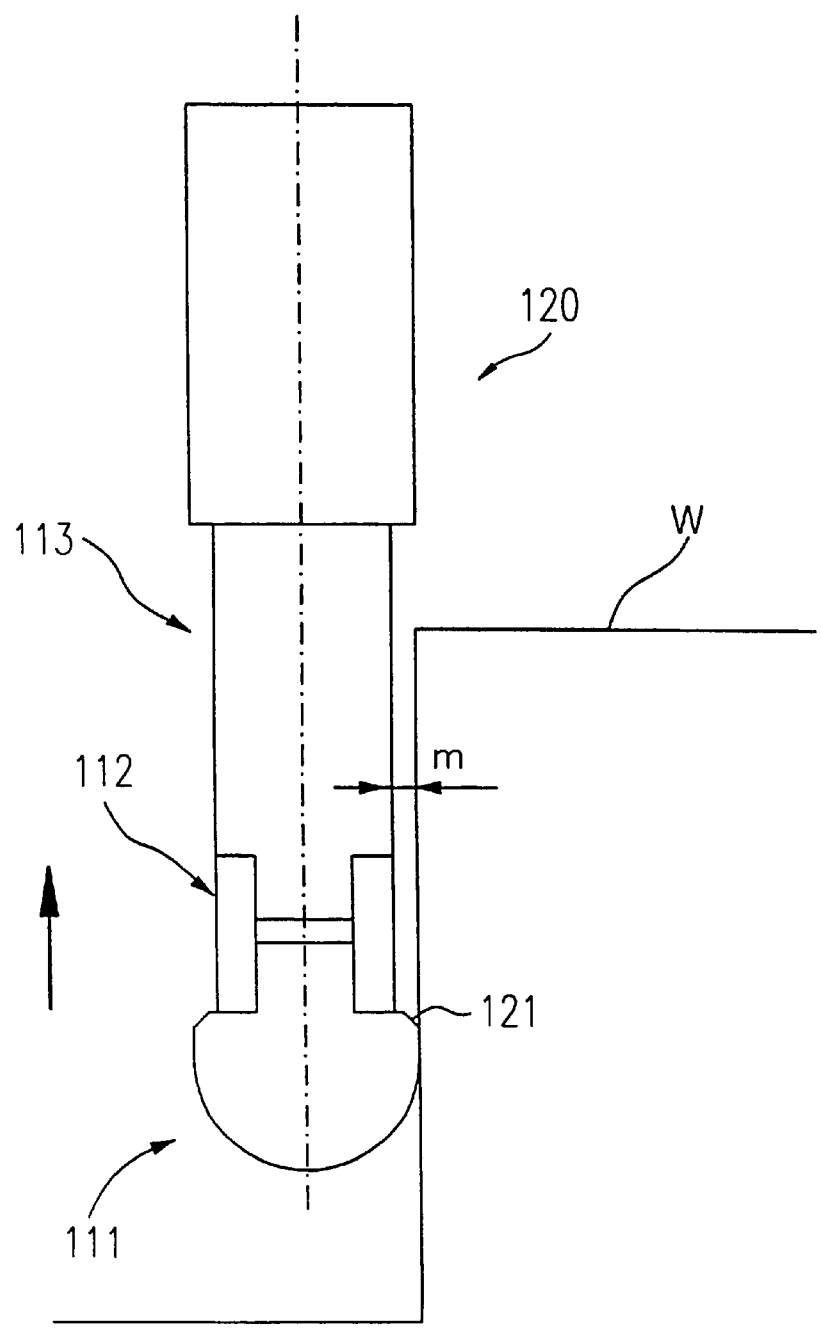
FIG. 9 is a longitudinal sectional view showing a state in which lift cutting is being performed by the ball endmill shown in FIG. 8.

In this way, the ball endmill having the cutting edge 121 in the stepped portion 114 allows lift cutting to be performed with the cutting edge 121 while the tool is being lifted, as shown in FIG. 9. For this reason, it is possible to effectively prevent smooth lifting from being hindered by the stepped portion 114 caught by a workpiece W when the ball endmill 120 is being raised from a hole, a groove, or the like.

Figure 10:
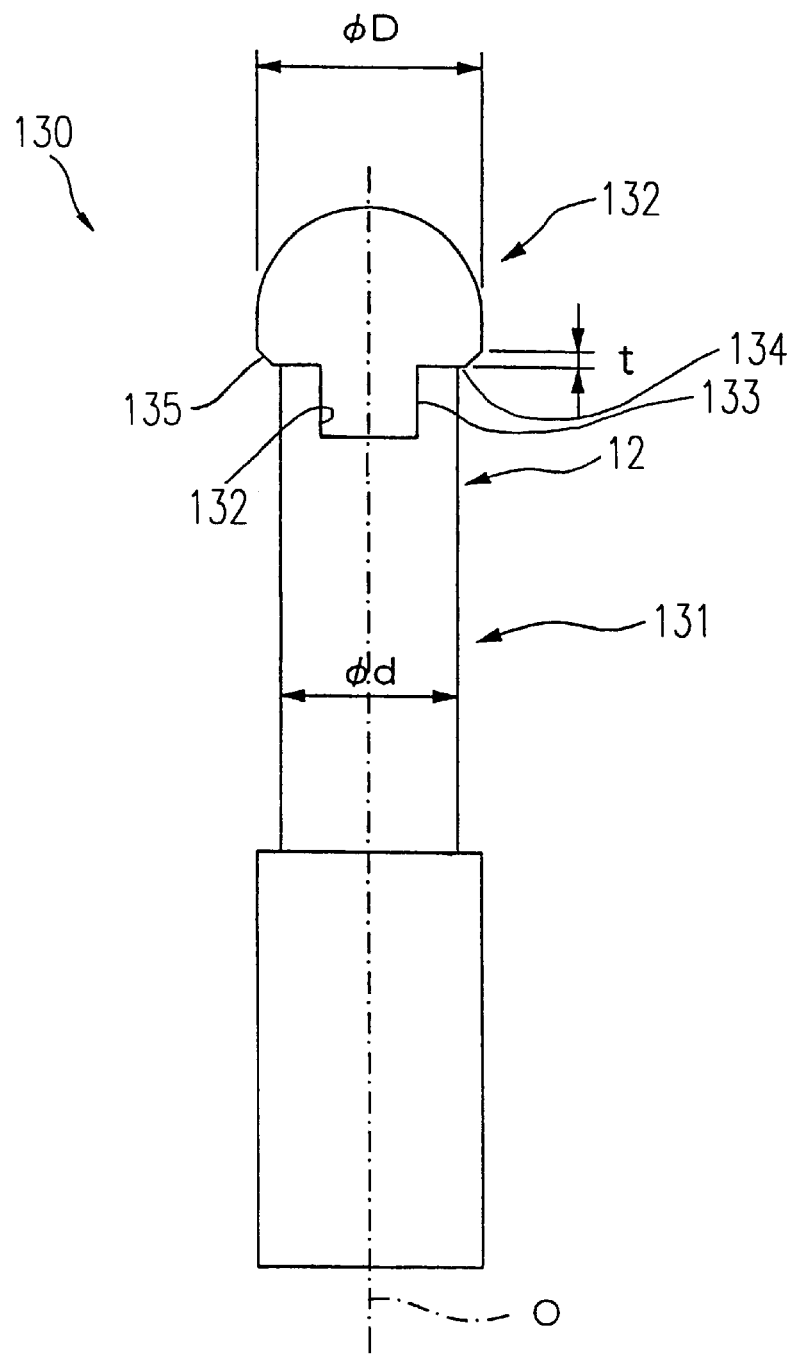
FIG. 10 is a longitudinal sectional view showing a modification of the ball endmill according to the eighth embodiment.

FIG. 10 shows a modification of the eighth embodiment. In this ball endmill 130, the connecting member 112 is not provided, a hole portion 132 is formed in a leading end face of a shank section 131, and a projection 133 is formed at the base end of an edge section 132. One of the projection 133 and the hole portion 132 has an interference so as to establish shrinkage fitting therebetween.

According to the ball endmill 130, in a state in which the edge section 132 is interference-fitted in the shank section 131, the outer diameter of the edge section 132 at the base end is larger than the outer diameter of the leading end face of the shank section 131. Therefore, a stepped portion 114 is formed, and a cutting edge 121 is provided in a part of or the overall stepped portion 114.

The present invention is not limited to the ball endmill, and is also applicable to various types of cutting tools, for example, a drill and other milling tools and a single-point tool and other turning tools.

What is claimed is:

1. An interference fit cutting tool comprising:
a tool;
a tool holding section configured to be connected to the tool in an interference-fit manner; and
a presser section configured to separate said tool from said tool holding section, wherein said tool and said tool holding section have projections, said projections are fitted into and connected by a connecting member, one of said projections and said connecting member has an interference, and a presser member is mounted in said presser section in one of said connecting member, said tool, and said tool holding section so as to press at least one of said tool holding section and said tool.

2. An interference fit cutting tool according to claim 1, wherein an intermediary member is provided in a space formed between said connecting member and said projections of said tool and said tool holding section, and wherein said presser member is placed to push at least one of said tool holding section and said tool via said intermediary member.

3. An interference fit cutting tool according to claim 2, herein a rib which is configured to guide said intermediary member is formed in said connecting member inside said space.

4. An interference fit cutting tool according to claim 1, wherein said presser section comprises a stepped portion formed by making a diameter of at least a part of a base end portion of said tool larger than that of a leading end portion of said tool holding section.

5. An interference fit cutting tool according to claim 1, wherein said tool is an edge section having a cutting edge, and said holding section is a shank section.

6. An interference fit cutting tool according to claim 1, wherein said connecting member has a higher coefficient of thermal expansion than those of said tool and said tool holding section.

7. An interference fit cutting tool comprising:

a tool;

a tool holding section configured to be connected to the tool in an interference-fit manner; and a presser section configured to separate said tool from said tool holding section, wherein said tool and said tool holding section have projections, both said projections are fitted into and connected by a connecting member, one of said projections and said connecting member has an interference, and said presser section comprises a stepped portion formed by making a diameter of at least a part of a base end portion of said tool larger than that of a leading end portion of said tool holding section.

8. An interference fit cutting tool according to claim 7, wherein a cutting edge is provided in said stepped portion.

9. An interference fit cutting tool comprising:

a tool;

a tool holding section configured to be connected to the tool in an interference-fit manner; and a presser section configured to separate said tool from said tool holding section, wherein one of said tool and said tool holding section have a hole portion, another of said tool and said tool holding section has a projection to be interference-fitted in the hole portion, wherein a presser member is mounted in said presser section in one of said tool and said tool holding section so as to press another of said tool and said tool holding section, and wherein said presser member is in threaded engagement with a threaded hole formed in said tool holding section to be configured to separate said tool from said tool holding section by pushing said tool.

10. An interference fit cutting tool according to claim 9, wherein an intermediary member is provided in a space formed between said tool and said tool holding section, and wherein said presser member is placed to push at least one of said tool holding section and said tool via said intermediary member.

11. An interference fit cutting tool according to claim 10, wherein a rib which is configured to guide said intermediary member is provided in said hole portion inside said space.

* * * * *